United States Patent
Newell et al.

(10) Patent No.: US 9,693,924 B2
(45) Date of Patent: Jul. 4, 2017

(54) ENHANCED BODY BAG

(71) Applicant: HONOR, LLC, Mount Vernon, IL (US)

(72) Inventors: Jason Alan Newell, Mount Vernon, IL (US); Brandon W. Schulte, Bonnie, IL (US)

(73) Assignee: Honor, LLC, Mount Vernon, IL (US)

(*) Notice: Subject to any disclaimer, the term of this patent is extended or adjusted under 35 U.S.C. 154(b) by 43 days.

(21) Appl. No.: 14/510,823

(22) Filed: Oct. 9, 2014

(65) Prior Publication Data

US 2016/0101009 A1    Apr. 14, 2016

(51) Int. Cl.
| | | |
|---|---|---|
| *A61G 17/06* | (2006.01) | |
| *A61G 17/007* | (2006.01) | |
| *A61G 17/00* | (2006.01) | |
| *A61G 17/04* | (2006.01) | |
| *B32B 1/00* | (2006.01) | |

(52) U.S. Cl.
CPC ........... *A61G 17/06* (2013.01); *A61G 17/004* (2016.11); *A61G 17/007* (2013.01); *A61G 17/041* (2016.11); *B32B 1/00* (2013.01); *B32B 2439/06* (2013.01); *B32B 2439/46* (2013.01)

(58) Field of Classification Search
CPC .................. A61G 17/06; A61G 17/007; A61G 2017/041; A61G 2017/004; A61G 17/041; A61G 17/004; B32B 1/00; B32B 2439/06; B32B 2349/46; A01N 1/00; B65D 31/04; B65D 31/12; B65D 33/02; B65D 33/06; B65D 33/16

USPC .......... 27/28; 383/1, 6, 38, 41, 66, 67, 109; 493/186, 212; 224/157, 158; 5/625; 294/140

See application file for complete search history.

(56) References Cited

U.S. PATENT DOCUMENTS

| | | | | |
|---|---|---|---|---|
| 4,790,051 A | * | 12/1988 | Knight | A61G 1/01 27/28 |
| 4,922,562 A | | 5/1990 | Allred et al. | |
| 6,004,034 A | * | 12/1999 | Salam | A61G 17/06 27/28 |
| 6,052,877 A | | 4/2000 | Richard | |
| 7,337,511 B2 | * | 3/2008 | Yu | A62B 31/00 27/28 |
| 7,484,275 B2 | * | 2/2009 | Carroll | A61G 17/007 27/28 |
| 8,966,726 B2 | * | 3/2015 | Chua | A61G 17/06 27/28 |
| 8,991,019 B1 | * | 3/2015 | Calvert | A01N 1/00 27/28 |
| 9,216,128 B2 | * | 12/2015 | Richardson | A61G 17/06 |

(Continued)

FOREIGN PATENT DOCUMENTS

| | | |
|---|---|---|
| WO | 2011046509 A1 | 4/2011 |
| WO | 2011046510 A1 | 4/2011 |
| WO | 2011065919 A1 | 6/2011 |

*Primary Examiner* — William Miller
(74) *Attorney, Agent, or Firm* — Armstrong Teasdale LLP

(57) ABSTRACT

A body bag includes a first layer having an upper surface and a lower surface, and a second layer coupled to the first layer. The upper surface of the first layer at least partially defines a first cavity sized to receive the body. The second layer has an upper surface and a lower surface. The lower surface of the first layer and the upper surface of the second layer at least partially define a second cavity sized to receive a stiffening mechanism.

28 Claims, 7 Drawing Sheets

(56) References Cited

U.S. PATENT DOCUMENTS

| | | | |
|---|---|---|---|
| 2003/0145443 A1* | 8/2003 | Lee ..................... | A61G 17/06 27/28 |
| 2007/0009185 A1* | 1/2007 | Lee ..................... | A61G 17/06 383/16 |
| 2010/0011506 A1 | 1/2010 | Jensen et al. | |
| 2014/0259577 A1* | 9/2014 | Richardson ............ | A61G 17/06 27/28 |
| 2015/0099074 A1* | 4/2015 | McWilliams .......... | A61G 17/06 428/34.3 |
| 2015/0290068 A1* | 10/2015 | Schiavone ............. | A61G 17/06 27/28 |
| 2016/0101009 A1* | 4/2016 | Newell ................. | A61G 17/06 27/28 |

\* cited by examiner

ENHANCED BODY BAG

BACKGROUND

The field of the disclosure relates generally to containers, and, more particularly, to body bags configured to enclose a body therein.

Known body bags are configured to contain a body and are used to store and/or transport the body. However, at least some known body bags are fabricated from a rubber and/or plastic material that provides only a nominal amount of structural support to the body during storage and/or transportation.

BRIEF SUMMARY

In one aspect, a body bag is provided for enclosing a body therein. The body bag includes a first layer having an upper surface and a lower surface, and a second layer coupled to the first layer. The upper surface of the first layer at least partially defines a first cavity sized to receive the body. The second layer has an upper surface and a lower surface. The lower surface of the first layer and the upper surface of the second layer at least partially define a second cavity sized to receive a stiffening mechanism.

In another aspect, a body bag assembly is provided. The body bag assembly includes a body bag including a first layer having an upper surface and a lower surface, and a second layer coupled to the first layer. The upper surface of the first layer at least partially defines a first cavity sized to receive the body. The second layer has an upper surface and a lower surface. The lower surface of the first layer and the upper surface of the second layer at least partially define a second cavity. The body bag assembly further includes a stiffening mechanism configured to be at least partially housed within the second cavity.

In yet another aspect, a method is provided for providing a body bag enclosing a body therein. The method includes providing a first layer having an upper surface and a lower surface, and coupling a second layer to the first layer. The upper surface of the first layer at least partially defines a first cavity sized to receive the body. The second layer has an upper surface and a lower surface. The lower surface of the first layer and the upper surface of the second layer at least partially define a second cavity sized to receive a stiffening mechanism.

The features, functions, and advantages described herein may be achieved independently in various embodiments of the present disclosure or may be combined in yet other embodiments, further details of which may be seen with reference to the following description and drawings.

BRIEF DESCRIPTION OF THE DRAWINGS

FIG. 1 is a schematic cross-sectional view of an example body bag;

FIG. 2 is a schematic top view of the body bag shown in FIG. 1 in a first configuration;

FIG. 3 is a schematic top view of the body bag shown in FIG. 1 in a second configuration;

FIG. 4 is a schematic top view of the body bag shown in FIG. 1 in a third configuration;

FIG. 5 is a schematic bottom view of the body bag shown in FIG. 1;

FIG. 6 is a schematic side view of the body bag shown in FIG. 1;

FIG. 7 is a flowchart of an example method for providing the body bag shown in FIG. 1;

FIGS. 8-10 are schematic top views of another example body bag; and

FIGS. 11-14 are schematic top views of yet another example body bag.

Figure 1:
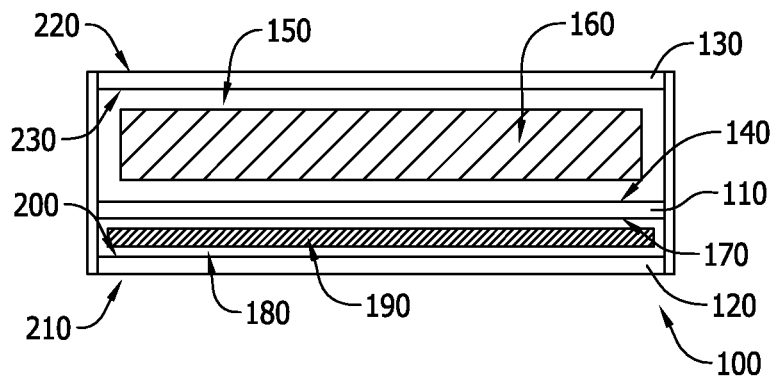
FIGS. 1-14 show example embodiments of the system and method described herein.

Although specific features of various embodiments may be shown in some drawings and not in others, such illustrations are for convenience only. Any feature of a drawing may be referenced and/or claimed in combination with any feature of any other drawing. Corresponding reference characters indicate corresponding parts throughout the several views of the drawings.

DETAILED DESCRIPTION

Example embodiments of an enhanced body bag are described herein. In one embodiment, an enhanced body bag includes a first layer that at least partially defines a first cavity sized to receive a body, and a second layer coupled to the first layer to at least partially define a second cavity sized to receive a stiffening mechanism. The separation of the first and second cavities provides easy and/or convenient access to either cavity during use of the body bag. For example, in one implementation, a stiffening mechanism may be positioned within the second cavity after a body has been placed within the first cavity.

The following detailed description illustrates embodiments of the disclosure by way of example and not by way of limitation.

An element or step recited in the singular and preceded with the word "a" or "an" should be understood as not excluding plural elements or steps unless such exclusion is explicitly recited. Moreover, references to an "example embodiment," "one embodiment," an "example implementation," or "one implementation" are not intended to be interpreted as excluding the existence of additional embodiments and/or implementations that also incorporate the recited features.

FIG. 1 is a schematic diagram of an example body bag 100. In the example embodiment, body bag 100 includes a first or middle layer 110, a second or lower layer 120, and a third or upper layer 130. In the example embodiment, middle layer 110 includes a first or upper surface 140 that at least partially defines a first or upper cavity 150 sized to receive a body 160, and a second or lower surface 170 that at least partially defines a second or lower cavity 180 sized to receive a stiffening mechanism 190. In the example embodiment, lower layer 120 includes a first or upper surface 200 that at least partially defines lower cavity 180, and a second or lower surface 210. In the example embodiment, upper layer 130 includes a first or upper surface 220, and a second or lower surface 230 that at least partially defines upper cavity 150.

In the example embodiment, upper cavity 150 is separate and/or distinct from lower cavity 180, such that upper cavity 150 and/or lower cavity 180 is accessible independent of the other cavity. That is, in the example embodiment, middle layer 110 restricts access and/or communication between upper cavity 150 and lower cavity 180. Alternatively, middle layer 110 may include an opening defined therethrough that provides access and/or communication between upper cavity 150 and lower cavity 180.

In the example embodiment, body bag 100 and/or its components (e.g., middle layer 110, lower layer 120, and/or upper layer 130) is fabricated from a material having a desired strength and/or durability characteristic that enables body bag 100 to store and/to transport body 160. In the example embodiment, the material used to fabricate body bag 100 has an impermeability characteristic that enables body bag 100 to substantially restrict liquid from entering and/or leaving upper cavity 150 and/or lower cavity 180.

In the example embodiment, stiffening mechanism 190 is a substantially planar board that is configured to provide structural support and/or form to body bag 100 when stiffening mechanism 190 is within lower cavity 180. Accordingly, in the example embodiment, stiffening mechanism 190 supports body 160 when body 160 is within upper cavity 150 and stiffening mechanism 190 is within lower cavity 180. In one embodiment, stiffening mechanism 190 is fabricated from a material having a desired strength and/or durability characteristic that enables body bag 100 to store and/to transport body 160.

Figure 2:
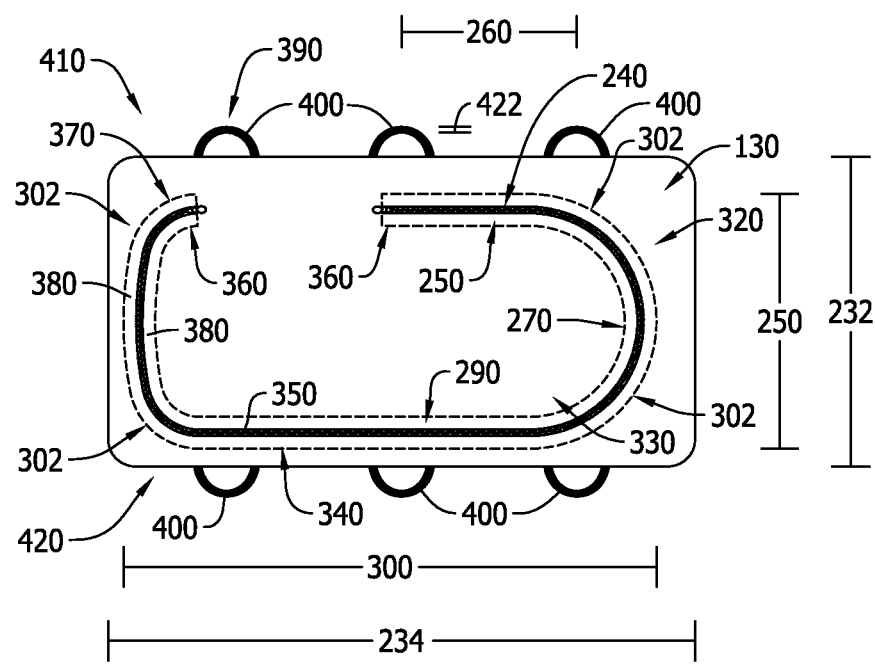
Figure 3:
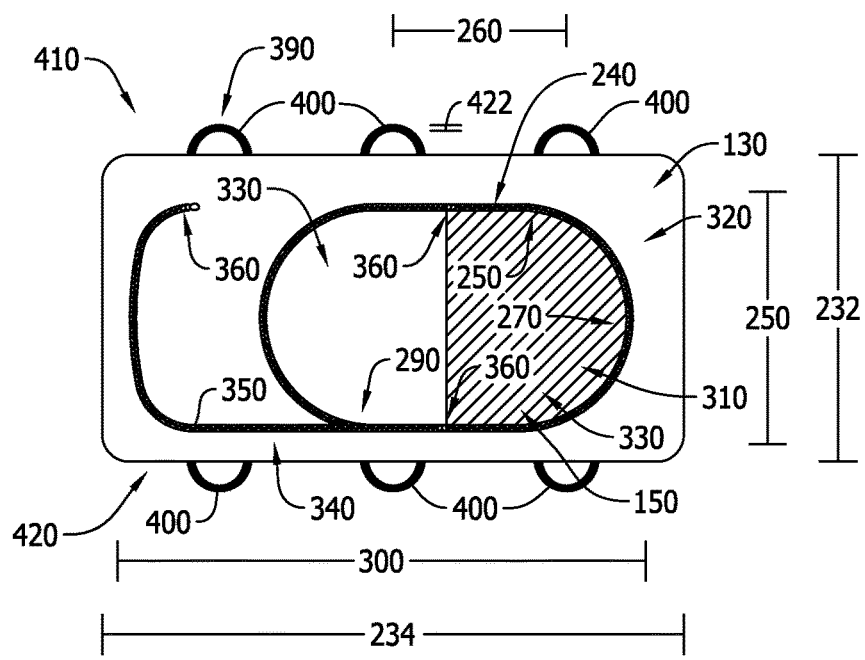
Figure 4:
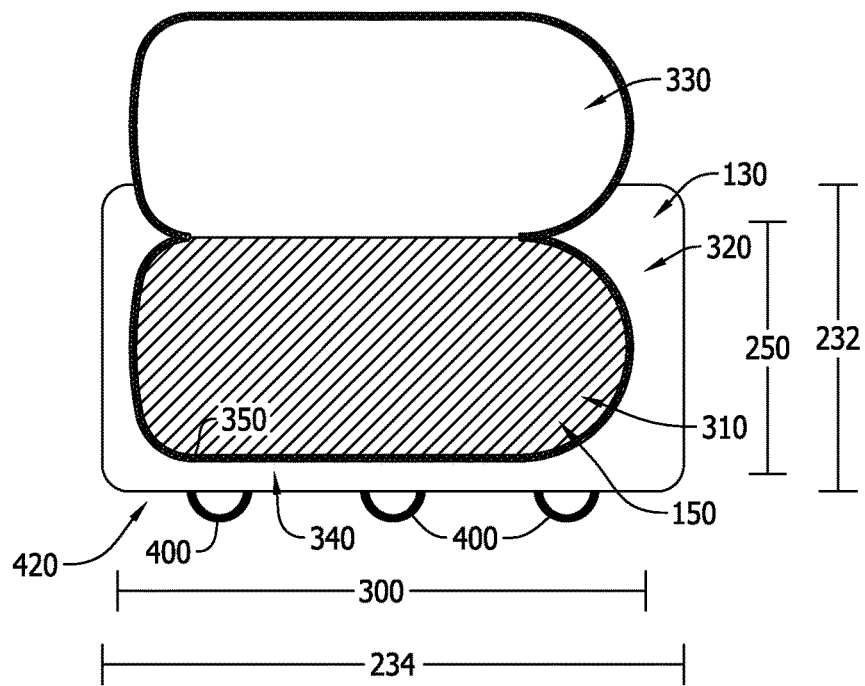

FIGS. 2-4 are schematic diagrams of a top view of body bag 100. In the example embodiment, body bag 110 has a width 232 of at least 12.0 inches (in.) and a length 234 of at least 24.0 in. More particularly, in the example embodiment, width 232 is between approximately 18.0 in. and approximately 48.0 in., and length 234 is between approximately 48.0 in. and 108.0 in. Even more particularly, in the example embodiment, width 232 is approximately 36.0 in., and length 234 is approximately 84 in. Alternatively, body bag 100 may have any size and/or configuration that enables body bag 100 to function as described herein.

In the example embodiment, upper layer 130 includes an opening edge 240 that is positioned and/or arranged to provide access to upper cavity 150 (not shown in FIG. 2) while maintaining a strength, durability, and/or impermeability characteristic that enables body bag 100 to function as described herein. For example, in the example embodiment, opening edge 240 has at least a first segment 250 extending a first distance 260 substantially longitudinally along body bag 100, a second segment 270 extending a second distance 280 substantially laterally across body bag 100, and a third segment 290 extending a third distance 300 substantially longitudinally along body bag 100. In the example embodiment, opening edge 240 has rounded corners 302 having a radius of at least 1.0 in. More particularly, in the example embodiment, the corner radius is between approximately 3.0 in. and 12 in. Even more particularly, in the example embodiment, the corner radius is approximately 6.0 in. Alternatively, opening edge 240 may have any configuration that enables body bag 100 to function as described herein.

In the example embodiment, opening edge 240 is configured to enable upper layer 130 to at least partially define an opening 310 (not shown in FIG. 2) therethrough and provide access to upper cavity 150. That is, in the example embodiment, opening edge 240 includes a first portion 320 and a second portion 330 that is selectively removable from first portion 320 to define opening 310. FIG. 2 shows body bag 100 in a closed configuration. FIG. 3 shows body bag 100 in a partially open configuration in which second portion 330 is configured to be folded and/or moved to at least partially define opening 310 such that opening 310 is sized to conveniently present body 160 (shown in FIG. 1) while being retained within body bag 100. FIG. 4 shows body bag 100 in an open configuration in which second portion 330 is configured to be folded and/or moved to at least partially define opening 310 such that opening 310 is sized to enable body 160 to extend therethrough and/or conveniently present body 160 while being retained within body bag 100.

In the example embodiment, body bag 100 includes at least one coupling mechanism 340 configured to selectively secure at least a portion of opening edge 240 (e.g., first portion 320 and/or second portion 330) such that opening 310 is closeable and/or openable. For example, in the example embodiment, coupling mechanism 340 includes a zipper track 350 positioned along opening edge 240 and at least one zipper 360 selectively slidable along zipper track 350. Alternatively, coupling mechanism 340 may be any coupling mechanism having any configuration and/or arrangement that enables body bag 100 to function as described herein.

As shown in phantom in FIG. 2, in at least some embodiments, body bag 100 includes a concealing mechanism 370 configured to selectively conceal at least a portion of coupling mechanism 340. In the example embodiment, concealing mechanism 370 includes at least one flap 380 that extends over at least a portion of coupling mechanism 340 such that coupling mechanism 340 is at least partially concealed from view.

In the exemplary embodiment, body bag 100 includes at least one handling mechanism 390 that enables body bag 100 to be handled in a convenient manner while maintaining a strength, durability, and/or impermeability characteristic that enables body bag 100 to function as described herein. For example, in the example embodiment, handling mechanism 390 includes a plurality of straps or handles 400 spaced substantially longitudinally along a first side 410 and/or a second side 420 of body bag 100 and coupled to an upper portion (shown in FIG. 6) of body bag 100. In the example embodiment, handles 400 have a width 422 of at least approximately 0.25 in. More particularly, in the example embodiment, width 422 is between approximately 0.5 in. and 3 in. Even more particularly, in the example embodiment, width 422 is approximately 2.0 in. Alternatively, handling mechanism 390 may be any handling mechanism having any configuration and/or arrangement that enables body bag 100 to function as described herein.

Figure 5:
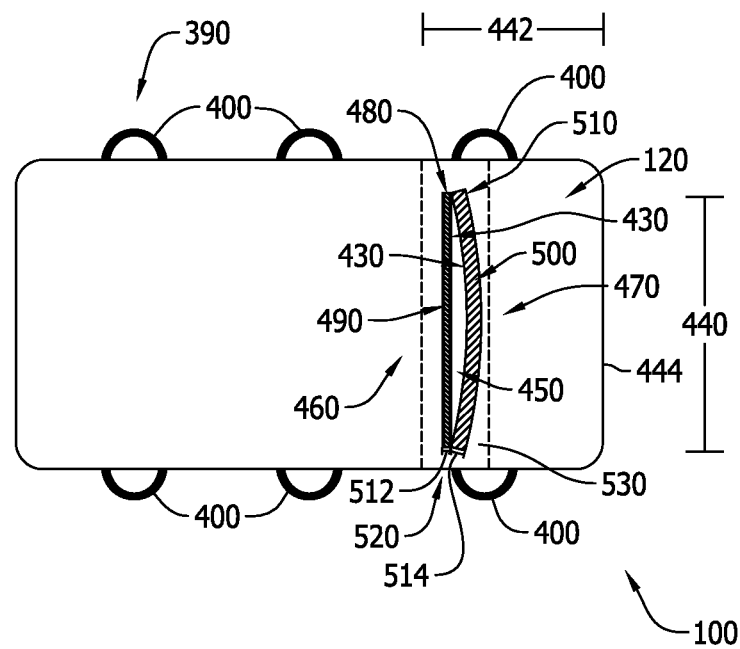

FIG. 5 is a schematic diagram of a bottom view of body bag 100. In the example embodiment, lower layer 120 includes an opening edge 430 that is positioned and/or arranged to provide access to lower cavity 180 while maintaining a strength, durability, and/or impermeability characteristic that enables body bag 100 to function as described herein. For example, in the example embodiment, opening edge 430 extends a distance 440 substantially laterally across body bag 100 between first side 410 and second side 420. Alternatively, opening edge 430 may extend substantially longitudinally along body bag 100. In the example embodiment, a distance 442 between opening edge 430 and an end 445 of body bag 100 is between approximately 4 in. and approximately 12 in. More particularly, in the example embodiment, distance 442 is between approximately 6.0 in. and 10 in. Even more particularly, in the example embodiment, distance 442 is approximately 8.0 in. Alternatively, opening edge 430 may have any configuration and/or arrangement that enables body bag 100 to function as described herein. For example, in one embodiment, middle layer 110 includes opening edge 430.

In the example embodiment, opening edge 430 is configured to enable lower layer 120 to at least partially define an opening 450 therethrough and provide access to lower cavity 180. That is, in the example embodiment, opening edge 430 includes a first portion 460 and a second portion 470 that is selectively removable from first portion 460 to define opening 450. In the example embodiment, first portion 460 and/or second portion 330 is configured to be moved to at least partially define opening 450 such that opening 450 is sized to enable stiffening mechanism 190 to extend therethrough.

In the example embodiment, body bag 100 includes at least one coupling mechanism 480 configured to selectively secure at least a portion of opening edge 430 (e.g., first portion 460 and/or second portion 470) such that opening 450 is closeable and/or openable. For example, in the example embodiment, coupling mechanism 480 includes a plurality of hooks and/or loops 490 positioned on first portion 460 along opening edge 430 and a plurality of hooks and/or loops 500 positioned on second portion 470 along opening edge 430. In one embodiment, hooks 490 are positioned on lower surface 210 of first portion 460, section portion 470 includes a flap 510 that at overlaps first portion 460, and loops 500 are positioned on upper surface 200 of flap 510. In such an embodiment, a width 512 of hooks 490 and/or a width 514 of loops 500 is less than approximately 3.0 in. More particularly, width 512 and/or width 514 is between approximately 0.5 in. and approximately 2.0 in. Even more particularly, width 512 and/or width 514 is approximately 1.0 in. Alternatively, coupling mechanism 480 may be any coupling mechanism having any configuration and/or arrangement that enables body bag 100 to function as described herein.

As shown in phantom, in at least some embodiments, body bag 100 includes a concealing mechanism 520 configured to selectively conceal at least a portion of coupling mechanism 480. In the example embodiment, concealing mechanism 520 includes at least one flap 530 that extends over at least a portion of coupling mechanism 480 such that coupling mechanism 480 is at least partially concealed from view.

Figure 6:
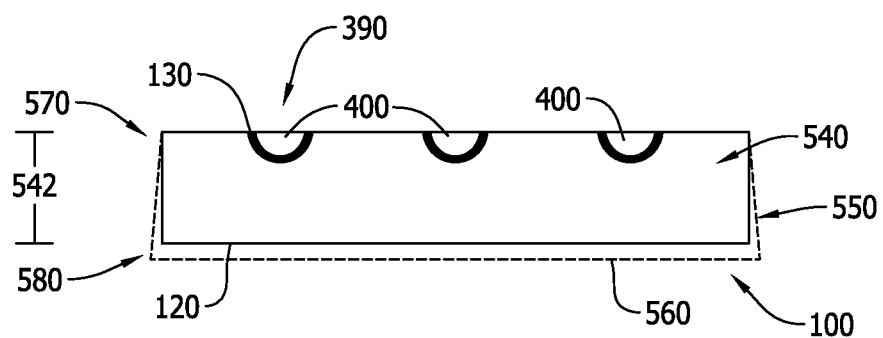

FIG. 6 is a schematic diagram of a side view of body bag 100. In the example embodiment, body bag 100 includes a gusset or sidewall 540 coupling middle layer 110 (shown in FIG. 1) to lower layer 120 and/or upper layer 130 such that sidewall 540 extends between middle layer 110 and lower layer 120 and/or between middle layer 110 and upper layer 130. In another embodiment, middle layer 110 may be coupled directly to lower layer 120 and/or upper layer 130. In yet another embodiment, a single piece of material is bent and/or folded to provide middle layer 110, lower layer 120, and/or upper layer 130. In the example embodiment, sidewall 540 facilitates providing depth and/or clearance to upper cavity 150 (shown in FIG. 1) and/or lower cavity 180 (shown in FIG. 1). For example, in the example embodiment, a length 542 of sidewall 540 is at least approximately 0.25 in. More particularly, in the example embodiment, length 542 is between approximately 1.0 in. and 3.0 in. Even more particularly, in the example embodiment, length 542 is approximately 2.0 in. Alternatively, sidewall 540 may have any configuration and/or arrangement that enables body bag 100 to function as described herein.

As shown in phantom, in at least some embodiments, body bag 100 includes a concealing mechanism 550 configured to selectively conceal at least a portion of sidewall 540. In the example embodiment, concealing mechanism 550 includes at least one skirt or flap 560 that extends over at least a portion of sidewall 540 such that sidewall 540 and/or handles 400 is at least partially concealed from view. In the exemplary embodiment, handles 400 are coupled to an upper portion 570 of body bag 100. Alternatively, handles 400 may be coupled to a lower portion 580 of body bag 100.

Figure 7:
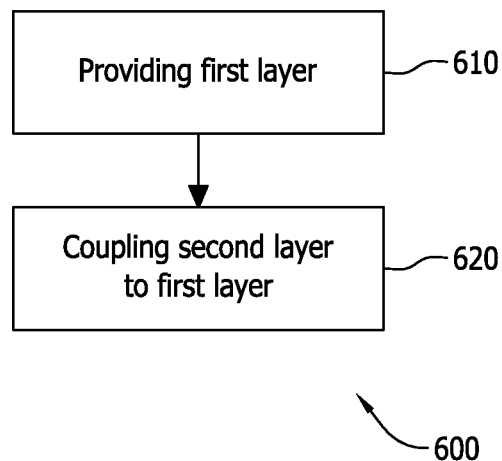

FIG. 7 is a flowchart of an example method 600 for providing body bag 100. In one implementation, method 600 includes providing 610 a middle layer 110, and coupling 620 a lower layer 120 to middle layer 110, such that a lower cavity 180 is defined therebetween. During use, a body 160 may be positioned above middle layer 110, and a stiffening mechanism 190 may be positioned within lower cavity 180 to provide structural support and/or form to body bag 100. In one implementation, handles 400 may be used to lift and/or support body bag 100. In such an implementation, a lateral force may be generated (e.g., using the handles may create a laterally-outward stress to body bag 100). In the example embodiment, the arrangement and/or orientation of opening edge 430 facilitates controlling an amount of force borne on first portion 460 and/or second portion 470.

Figure 8:
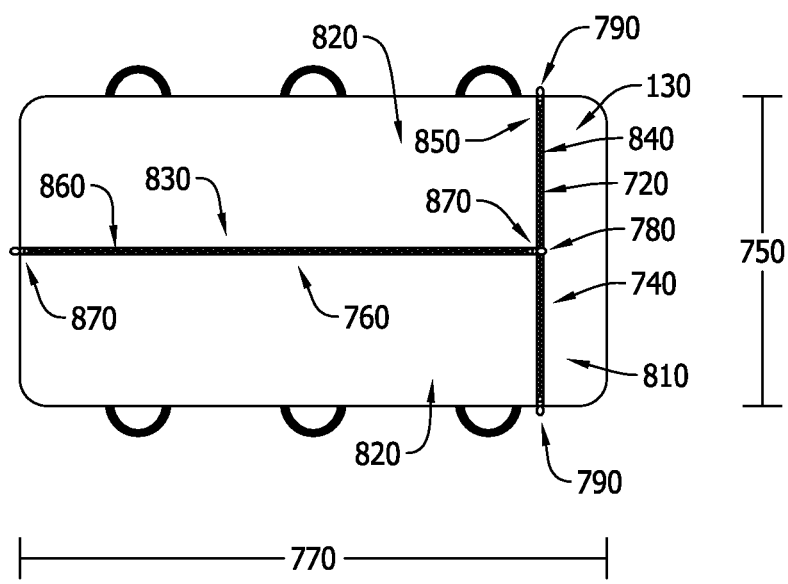
Figure 9:
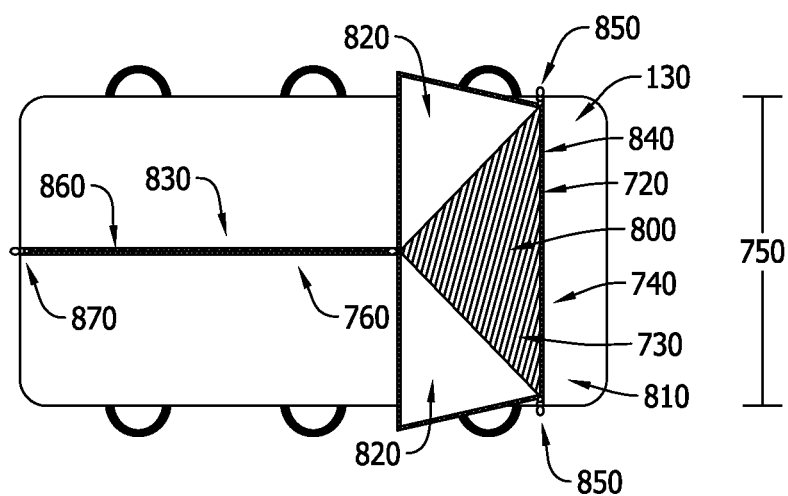
Figure 10:
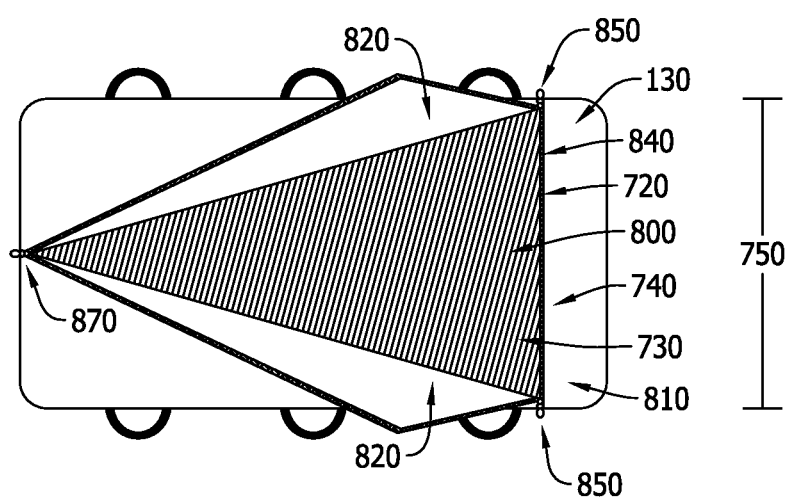

FIGS. 8-10 are schematic top views of another example body bag 700. Body bag 700 is substantially similar to body bag 100 with the exception of at least the opening edge. In the example embodiment, body bag 700 includes an upper layer 710 that includes an opening edge 720 that is positioned and/or arranged to provide access to upper cavity 730 (not shown in FIG. 8) while maintaining a strength, durability, and/or impermeability characteristic that enables body bag 700 to function as described herein. For example, in the example embodiment, opening edge 720 has at least a first segment 740 extending a first distance 750 substantially laterally across body bag 100, and a second segment 760 extending a second distance 770 substantially longitudinally along body bag 100 and bisecting first segment 740. In the example embodiment, second segment 760 bisects first segment 740 approximately and/or at a midpoint 780 of first segment 740 (i.e., substantially equidistant from either end 790 of first segment 740). Alternatively, second segment 760 may bisect first segment 740 at any location that enables body bag 700 to function as described herein.

In the example embodiment, opening edge 720 is configured to enable upper layer 710 to at least partially define an opening 800 (not shown in FIG. 8) therethrough and provide access to upper cavity 730. That is, in the example embodiment, opening edge 720 includes a first portion 810 and at least one second portion 820 that is selectively removable from first portion 810 to define opening 800. FIG. 8 shows body bag 700 in a closed configuration. FIG. 9 shows body bag 700 in a partially open configuration in which second portion 820 is configured to be folded and/or moved to at least partially define opening 800 such that opening 800 is sized to conveniently present body 160 (shown in FIG. 1) while being retained within body bag 700. In the example embodiment, each second portion 820 is selectively removed from first portion 810 and at least a portion of each second portion 820 is selectively removed from each other. FIG. 10 shows body bag 700 in an open configuration in which second portion 820 is configured to be folded and/or moved to at least partially define opening 800 such that opening 800 is sized to enable body 160 to extend therethrough and/or conveniently present body 160 while being retained within body bag 700. In the example embodiment, each second portion 820 is selectively removed from first portion 810 and from each other.

In the example embodiment, body bag 700 includes at least one coupling mechanism 830 configured to selectively secure at least a portion of opening edge 720 (e.g., first portion 810 and/or second portion 820) such that opening 800 is closeable and/or openable. For example, in the example embodiment, coupling mechanism 830 includes a first zipper track 840 positioned along first segment 740, at least one first zipper 850 selectively slidable along first zipper track 840, a second zipper track 860 positioned along second segment 760, and at least one second zipper 870 selectively slidable along second zipper track 860. Alternatively, coupling mechanism 830 may be any coupling mechanism having any configuration and/or arrangement that enables body bag 700 to function as described herein.

FIGS. 11-14 are schematic top views of yet another example body bag 900. Body bag 900 is substantially similar to body bag 100 and/or body bag 700 with the exception of at least the opening edge. In the example embodiment, body bag 900 includes an upper layer 910 that includes an opening edge 920 that is positioned and/or arranged to provide access to upper cavity 930 (not shown in FIG. 10) while maintaining a strength, durability, and/or impermeability characteristic that enables body bag 900 to function as described herein. For example, in the example embodiment, opening edge 920 has at least a first segment 940 extending a first distance 950 substantially laterally across body bag 900, a second segment 960 extending a second distance 970 substantially laterally across body bag 900, and a third segment 980 extending a third distance 990 substantially longitudinally along body bag 900 between first segment 940 and second segment 960 and bisecting first segment 940 and/or second segment 960. In the example embodiment, third segment 980 bisects first segment 940 and/or second segment 960 approximately and/or at a midpoint 1000 of first segment 940 and/or second segment 960 (i.e., substantially equidistant from either end 1010 of first segment 940 and/or second segment 960). Alternatively, third segment 980 may bisect first segment 940 and/or second segment 960 at any location that enables body bag 900 to function as described herein.

Figure 11:
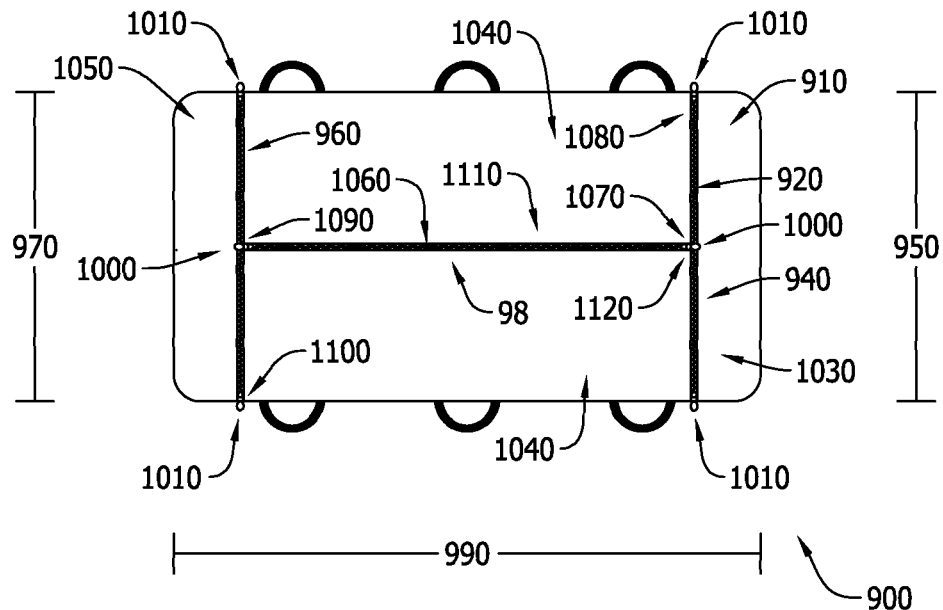
Figure 12:
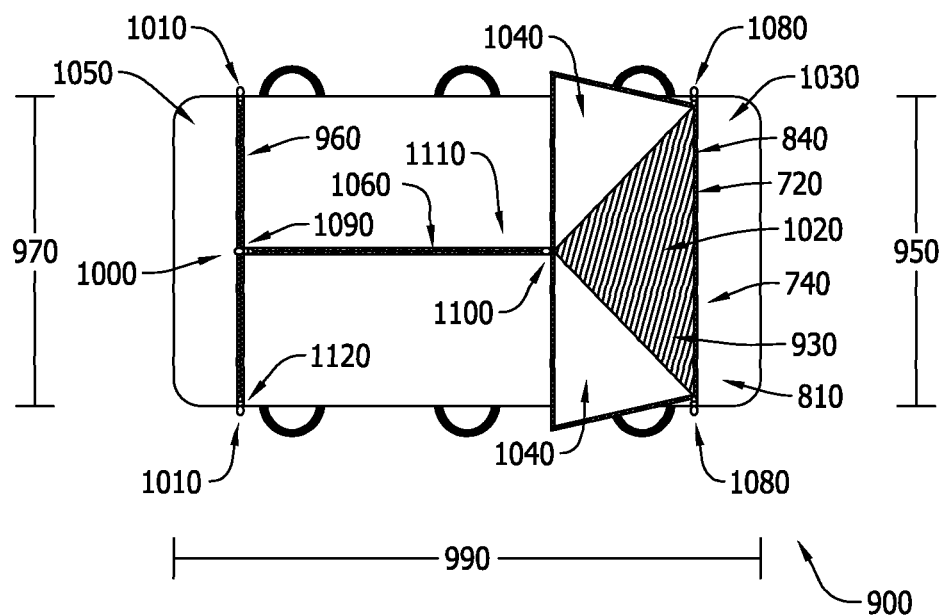
Figure 13:
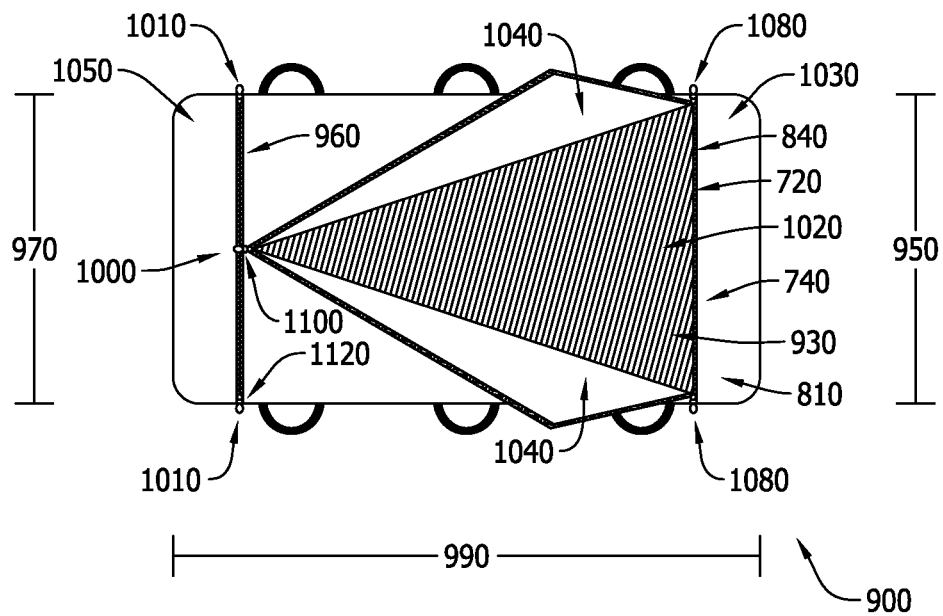
Figure 14:
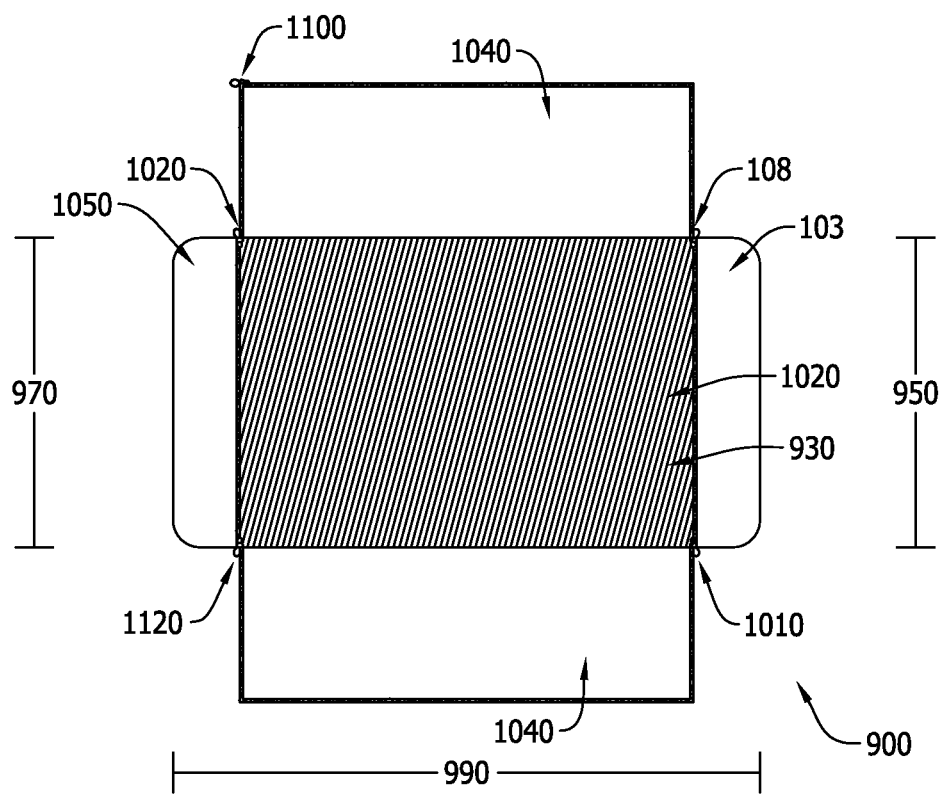

In the example embodiment, opening edge 920 is configured to enable upper layer 910 to at least partially define an opening 1020 (not shown in FIG. 11) therethrough and provide access to upper cavity 930. That is, in the example embodiment, opening edge 920 includes a first portion 1030 and at least one second portion 1040 that is selectively removable from first portion 1030 to define opening 1020. FIG. 11 shows body bag 900 in a closed configuration. FIG. 12 shows body bag 900 in a partially open configuration in which second portion 1040 is configured to be folded over and/or moved to at least partially define opening 1020 such that opening 1020 is sized to conveniently present body 160 (shown in FIG. 1) while being retained within body bag 900. In the example embodiment, each second portion 1040 is selectively removed from first portion 1030 and at least a portion of each second portion 820 is selectively removed from each other. FIG. 13 shows body bag 900 in another partially open configuration in which second portion 1040 is configured to be folded and/or moved to at least partially define opening 1020 such that opening 1020 is sized to enable body 160 to extend therethrough and/or conveniently present body 160 while being retained within body bag 900. In the example embodiment, each second portion 1040 is selectively removed from first portion 1030 and from each other. FIG. 14 shows body bag 900 in an open configuration in which at least one second portion 1040 is selectively removed from first portion 1030 and a third portion 1050. In the example embodiment, each second portion 1040 is selectively removed from first portion 1030, from each other, and from third portion 1050.

In the example embodiment, body bag 900 includes at least one coupling mechanism 1060 configured to selectively secure at least a portion of opening edge 920 (e.g., first portion 1030, second portion 1040, and/or third portion 1050) such that opening 1020 is closeable and/or openable. For example, in the example embodiment, coupling mechanism 1060 includes a first zipper track 1070 positioned along first segment 940, at least one first zipper 1080 selectively slidable along first zipper track 1070, a second zipper track 1090 positioned along second segment 960, at least one second zipper 1100 selectively slidable along second zipper track 1090, a third zipper track 1110 positioned along third segment 980, at least one third zipper 1120 selectively slidable along third zipper track 1110. Alternatively, coupling mechanism 830 may be any coupling mechanism having any configuration and/or arrangement that enables body bag 900 to function as described herein.

The embodiments described herein facilitate providing a versatile body bag that is designed to provide easy and/or convenient access to an upper cavity for a body or a lower cavity for a stiffening mechanism. Moreover, the embodiments described herein may be used to store, transport, present, and/or cremate a body in a more convenient and/or efficient manner. The systems and methods described herein are not limited to the specific embodiments described herein but, rather, operations of the methods and/or components of the system and/or apparatus may be utilized independently and separately from other operations and/or components described herein.

Although the present disclosure is described in connection with the death-care industry, embodiments of the present disclosure are operational with numerous other general purpose or special purpose environments or configurations that use a container. The connection with the death-care industry is not intended to suggest any limitation as to the scope of use or functionality of any aspect of the disclosure. Moreover, the death-care industry should not be interpreted as having any dependency or requirement relating to any one or combination of components illustrated in the example environment.

The present disclosure uses examples to disclose the best mode and also to enable any person skilled in the art to practice the claimed subject matter, including making and using any devices or systems and performing any incorporated methods. The patentable scope of the present disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A body bag for enclosing a body therein, the body bag comprising:
a first layer having an upper surface and a lower surface, wherein the upper surface of the first layer at least partially defines a first cavity sized to receive the body;
a second layer coupled to the first layer, the second layer having an upper surface and a lower surface, wherein the lower surface of the first layer and the upper surface of the second layer at least partially define a second cavity sized to receive a stiffening mechanism; and
a third layer having an upper surface and a lower surface, wherein the lower surface of the third layer at least partially defines the first cavity sized to receive the body, wherein the third layer includes an opening edge that at least partially defines an opening sized to enable the body to extend therethrough, the opening edge having a first portion extending substantially longitudinally along the body bag, a second portion extending substantially laterally across the body bag, and a third portion extending substantially longitudinally along the body bag.

2. A body bag in accordance with claim 1, wherein the opening edge is a first opening edge, and wherein at least one of the first layer and the second layer includes a second opening edge that at least partially defines an opening sized to enable the stiffening mechanism to extend therethrough, the second opening edge extending substantially laterally across the body bag.

3. A body bag in accordance with claim 2 further comprising a coupling mechanism configured to selectively secure at least a portion of the second opening edge.

4. A body bag in accordance with claim 3 further comprising a concealing mechanism configured to selectively conceal at least a portion of the coupling mechanism.

5. A body bag in accordance with claim 1 further comprising a plurality of handling mechanisms spaced longitudinally along the body bag.

6. A body bag in accordance with claim 1, wherein the body bag further comprises a coupling mechanism configured to selectively secure at least a portion of the opening edge.

7. A body bag in accordance with claim 6 further comprising a concealing mechanism configured to selectively conceal at least a portion of the coupling mechanism.

8. A body bag assembly for enclosing a body therein, the body bag assembly comprising:
a body bag comprising:
a first layer having an upper surface and a lower surface, wherein the upper surface of the first layer at least partially defines a first cavity sized to receive the body;
a second layer coupled to the first layer, the second layer having an upper surface and a lower surface, wherein the lower surface of the first layer and the upper surface of the second layer at least partially define a second cavity, wherein at least one of the first layer and the second layer includes an opening edge that extends substantially laterally across the body bag;
a coupling mechanism configured to selectively secure at least a portion of the opening edge; and
a concealing mechanism configured to selectively conceal at least a portion of the coupling mechanism; and
a stiffening mechanism configured to be at least partially housed within the second cavity, wherein the opening edge at least partially defines an opening sized to enable the stiffening mechanism to extend therethrough.

9. A body bag assembly in accordance with claim 8, wherein the body bag further comprises a plurality of handling mechanisms spaced longitudinally along the body bag.

10. A body bag assembly in accordance with claim 8, wherein the opening edge is a first opening edge, the body bag further comprising a third layer having an upper surface and a lower surface, wherein the lower surface of the third layer at least partially defines the first cavity sized to receive the body, the third layer including a second opening edge that at least partially defines an opening sized to enable the body to extend therethrough, the second opening edge having a first portion extending a first distance substantially longitudinally along the body bag, a second portion extending a second distance substantially laterally across the body bag, and a third portion extending a third distance substantially longitudinally along the body bag.

11. A body bag assembly in accordance with claim 8, wherein the opening edge is a first opening edge, the body bag further comprising a third layer having an upper surface and a lower surface, wherein the lower surface of the third layer at least partially defines the first cavity sized to receive the body, the third layer including a second opening edge that at least partially defines an opening sized to enable the body to extend therethrough, the second opening edge having a first portion extending substantially laterally across the body bag, and a second portion extending substantially longitudinally along the body bag such that the second portion bisects the first portion.

12. A body bag assembly in accordance with claim 8, wherein the opening edge is a first opening edge, the body bag further comprising a third layer having an upper surface and a lower surface, wherein the lower surface of the third layer at least partially defines the first cavity sized to receive the body, the third layer including a second opening edge that at least partially defines an opening sized to enable the body to extend therethrough, the second opening edge having a first portion extending substantially laterally across the body bag, a second portion extending substantially laterally across the body bag, and a third portion extending substantially longitudinally along the body bag such that the second portion bisects the first portion and the second portion.

13. A body bag assembly in accordance with claim 8, wherein the opening edge is a first opening edge, the coupling mechanism is a first coupling mechanism, and the concealing mechanism is a first concealing mechanism, the body bag further comprising:
a third layer having an upper surface and a lower surface, wherein the lower surface of the third layer at least partially defines the first cavity sized to receive the body, the third layer including a second opening edge that at least partially defines an opening sized to enable the body to extend therethrough;
a second coupling mechanism configured to selectively secure at least a portion of the second opening edge; and
a second concealing mechanism configured to selectively conceal at least a portion of the second coupling mechanism.

14. A method of providing a body bag for enclosing a body therein, the method comprising:
providing a first layer having an upper surface and a lower surface, wherein the upper surface of the first layer at least partially defines a first cavity sized to receive the body;
coupling a second layer to the first layer, the second layer having an upper surface and a lower surface, wherein the lower surface of the first layer and the upper surface of the second layer at least partially define a second cavity sized to receive a stiffening mechanism, wherein at least one of the first layer and the second layer includes an opening edge that at least partially defines an opening sized to enable the stiffening mechanism to extend therethrough, the opening edge extending substantially laterally across the body bag;
coupling a first coupling mechanism to the at least one of the first layer and the second layer, the first coupling mechanism selectively securing at least a portion of the opening edge;
positioning a first concealing mechanism to selectively conceal at least a portion of the first coupling mechanism;
coupling a third layer to at least one of the first layer and the second layer, the third layer having an upper surface and a lower surface, wherein it the lower surface of the third layer at least partially defines the first cavity sized to receive the body, the third layer including a second opening edge that at least partially defines an opening sized to enable the body to extend therethrough;

coupling a second coupling mechanism to the third layer, the second coupling mechanism electively securing at least a portion of the second opening edge; and positioning a second concealing mechanism to selectively conceal at least a portion of the second coupling mechanism.

15. A body bag for enclosing a body therein, the body bag comprising:

a first layer having an upper surface and a lower surface, wherein the upper surface of the first layer at least partially defines a first cavity sized to receive the body;

a second layer coupled to the first layer, the second layer having an upper surface and a lower surface, wherein the lower surface of the first layer and the upper surface of the second layer at least partially define a second cavity' sized to receive a stiffening mechanism; and a third layer having an upper surface and a lower surface, wherein the lower surface of the third layer at least partially defines the first cavity sized to receive the body, wherein the third layer includes an opening edge that at least partially defines an opening sized to enable the body to extend therethrough, the opening edge having a first portion extending substantially laterally across the body bag, and a second portion extending substantially longitudinally along the body bag such that the second portion bisects the first portion.

16. A body bag in accordance with claim 15, wherein the opening edge is a first opening edge, and wherein at least one of the first layer and the second layer includes a second opening edge that at least partially defines an opening sized to enable the stiffening mechanism to extend therethrough, the second opening edge extending substantially laterally across the body bag.

17. A body bag in accordance with claim 16 further comprising a coupling mechanism configured to selectively secure at least a portion of the second opening edge.

18. A body bag in accordance with claim 17 further comprising a concealing mechanism configured to selectively conceal at least a portion of the coupling mechanism.

19. A body bag in accordance with claim 15 further comprising a plurality of handling mechanisms spaced longitudinally along the body bag.

20. A body bag in accordance with claim 15 further comprising a coupling mechanism configured to selectively secure at least a portion of the opening edge.

21. A body bag in accordance with claim 20 further comprising a concealing mechanism configured to selectively conceal at least a portion of the coupling mechanism.

22. A body bag in accordance with claim 20 further comprising a concealing mechanism configured to selectively conceal at least a portion of the coupling mechanism.

23. A body bag for enclosing a body therein, the body bag comprising:

a first layer having an upper surface and a lower surface, wherein the upper surface of the first layer at least partially defines a first cavity sized to receive the body;

a second layer coupled to the first layer, the second layer having an upper surface and a lower surface, wherein the lower surface of the first layer and the upper surface of the second layer at least partially define a second cavity sized to receive a stiffening mechanism; and a third layer having an upper surface and a lower surface, wherein the lower surface of the third layer at least partially defines the first cavity sized to receive the body, wherein the third layer includes an opening edge that at least partially defines an opening sized to enable the body to extend therethrough, the opening edge having a first portion extending substantially laterally across the body bag, a second portion extending substantially laterally across the body bag, and a third portion extending substantially longitudinally along the body bag such that the second portion bisects the first portion and the second portion.

24. A body bag in accordance with claim 23, wherein the opening edge is a first opening edge, and wherein at least one of the first layer and the second layer includes a second opening edge that at least partially defines an opening sized to enable the stiffening mechanism to extend therethrough, the second opening edge extending substantially laterally across the body bag.

25. A body bag in accordance with claim 24 further comprising a coupling mechanism configured to selectively secure at least a portion of the second opening edge.

26. A body bag in accordance with claim 25 further comprising a concealing mechanism configured to selectively conceal at least a portion of the coupling mechanism.

27. A body bag in accordance with claim 23 further comprising a plurality of handling mechanisms spaced longitudinally along the body bag.

28. A body bag in accordance with claim 23 further comprising a coupling mechanism configured to selectively secure at least a portion of the opening edge.

* * * * *